United States Patent
Kwak et al.

(10) Patent No.: US 7,394,515 B2
(45) Date of Patent: Jul. 1, 2008

(54) LIQUID CRYSTAL DISPLAY PANEL

(75) Inventors: Dong-Yeung Kwak, Daegu (KR); Wang-Seob Kil, Daejeon (KR)

(73) Assignee: LG Display Co., Ltd., Seoul (KR)

( * ) Notice: Subject to any disclaimer, the term of this patent is extended or adjusted under 35 U.S.C. 154(b) by 469 days.

(21) Appl. No.: 11/020,174

(22) Filed: Dec. 27, 2004

(65) Prior Publication Data

US 2005/0140910 A1 Jun. 30, 2005

(30) Foreign Application Priority Data

Dec. 26, 2003  (KR) ............... 10-2003-0097972

(51) Int. Cl.
*G02F 1/1345* (2006.01)
(52) U.S. Cl. .................. 349/151; 349/153
(58) Field of Classification Search ......... 349/149–153, 349/158, 54, 40
See application file for complete search history.

(56) References Cited

U.S. PATENT DOCUMENTS

| | | | |
|---|---|---|---|
| 6,175,394 B1* | 1/2001 | Wu et al. | 349/40 |
| 6,882,396 B2* | 4/2005 | Ko et al. | 349/149 |
| 6,882,398 B2* | 4/2005 | Watanabe et al. | 349/153 |

* cited by examiner

*Primary Examiner*—Thoi V Duong
(74) *Attorney, Agent, or Firm*—McKenna Long & Aldridge LLP

(57) ABSTRACT

A liquid crystal display panel includes first and second substrates attached to each other by a seal pattern, the seal pattern being outside of a display region, a liquid crystal layer between the first and second substrates in the display region, a silver dot outside the seal pattern for electrically connecting the first substrate to the second substrate, and a first line-on-glass line and a second line-on-glass line on the first substrate outside the display region, the first line-on-glass line is completely in a pad region outside of the silver dot.

16 Claims, 4 Drawing Sheets

UV RAY

LIQUID CRYSTAL DISPLAY PANEL

The present application claims the benefit of Korean Patent Application No. 97972/2003 filed in Korea on Dec. 26, 2003, which is hereby incorporated by reference.

BACKGROUND OF THE INVENTION

1. Field of the Invention

The present invention relates to a display device, and, more particularly, to a liquid crystal display panel in which line-on-glass lines for applying signals to a gate driving circuit are formed at various locations based on the importance of the signals supplied thereto.

2. Discussion of the Related Art

In general, a liquid crystal display (LCD) device includes a liquid crystal display panel in which a thin film transistor (TFT) array substrate and a color filter substrate attached to each other having a predetermined cell-gap therebetween. A liquid crystal layer is formed in the cell-gap between the TFT array substrate and the color filter substrate; The LCD device also includes a driving unit for applying a scan signal and image information to the liquid crystal display panel, such that images are displayed on the liquid crystal display panel. Further, the LCD device includes a back-light unit for supplying light to the liquid crystal display panel.

On the TFT array substrate of the liquid crystal display panel, a plurality of gate lines are horizontally arranged and a plurality of data lines are vertically arranged, such that the gate and data lines cross each other and define a plurality of pixels. In the pixels, switching elements, such as TFTs, are provided, and the switching elements are electrically connected to the data lines and the gate lines. Also, in the pixels, pixel electrodes that form an electric field in the liquid crystal layer together with common electrodes of the color filter substrate are provided, such that the pixel electrodes are connected to the switching elements, respectively. In particular, a region in which the pixels are arranged on the TFT array substrate in a matrix to display images generally is referred to as an image display region.

Red, green, and blue color filter layers for transmitting color light are formed on the color filter substrate of the liquid crystal display panel. Outside the color filter layers, black matrix layers for preventing light from leaking are formed in the shape of a net. Common electrodes are formed on the entire surface of the color filter substrate. An electric field is applied to the liquid crystal layer by the voltage difference between a common voltage applied to the common electrodes and a voltage of image information applied to the pixel electrodes of the TFT array substrate to change the arrangement state of liquid crystal molecules, such that the transmittance of light supplied from the back-light unit is controlled. As a result, images are displayed.

FIG. 1 is a schematic planar view of a liquid crystal display device according to the related art. In FIG. 1, a liquid crystal display device includes a liquid crystal display panel 10, a plurality of gate TCPs 22 connected to one short side of the liquid crystal display panel 10 and to a gate printed circuit board 21, a plurality of gate driving integrated circuits 23 mounted on the gate TCPs 22, respectively, a plurality of data TCPs 32 connected to one long side of the liquid crystal display panel 10 and to a data printed circuit board 31, and a plurality of data driving integrated circuits 33 mounted on the data TCPs 32, respectively.

In the liquid crystal display panel 10, a TFT array substrate 11 and a color filter substrate 12 are attached to each other with a predetermined cell-gap therebetween and a liquid crystal layer is formed in the cell-gap. Since the TFT array substrate 11 is larger than the color filter substrate 12, the edge of the TFT array substrate 11 is exposed to the outside when the two substrates are attached to each other. In the exposed region of the TFT transistor array substrate 11, a gate pad region and a data pad region are provided therein.

On the TFT array substrate 11, a plurality of pixels (not shown) are arranged in a matrix in an image display region 13 in which images are displayed. For instance, a plurality of gate lines 20 are arranged in a horizontal direction to be connected to the gate pad region and a plurality of data lines 30 are arranged in a vertical direction to be connected to the data pad region. Also, the gate lines 20 and the data lines 30 cross each other, thereby defining a plurality of pixel regions. The pixels include switching elements and pixel electrodes.

On the color filter substrate 12, red, green, and blue color filters are formed to correspond to the pixels, such that the red, green, and blue color filters are separated from one another by the black matrix to produce color light. In addition, common electrodes that generate an electric field applied to the liquid crystal layer with the pixel electrodes are also formed on the color filter substrate 12.

The data TCPs 32 are electrically connected to the data printed circuit board 31 by a plurality of data TCP input lines 34 and to the data pad region by a plurality of data TCP output lines 35. Image information supplied from the data printed circuit board 31 is applied to the data driving integrated circuits 33 through the TCP input lines 34. Image information digital-analog converted by the data driving integrated circuits 33 is outputted through the TCP output lines 35 and is applied to the data lines 30.

The gate TCPs 22 are attached to the gate printed circuit board 21 by a plurality of gate TCP input lines 24 and to the gate pad region by a plurality of gate TCP output lines 25. The gate driving integrated circuits 23 output scan signals to the gate lines 20 in response to various control signals and driving voltages received from the gate printed circuit board 21.

The gate driving integrated circuits 23 sequentially apply the scan signals to the gate lines 20 every frame. For instance, a scan signal having a high potential is applied to one gate line 20 and scan signals having a low potential are applied to the remaining gate lines 20. When the scan signal having the high potential is applied to the gate line 20, switching elements (not shown) electrically connected to the gate line 20 are conducted and image information supplied from the data lines 30 through the conducted switching elements is applied to the pixel electrodes. Thus, an electric field is formed between the pixel electrodes to which image information is applied and the common electrodes. The arrangement of the liquid crystal molecules that constitute the liquid crystal layer is changed by the electric field, such that the transmittance of light supplied from a back-light device (not shown) is controlled.

Research on thinner and lighter LCD devices has been continuously conducted. One alternative for manufacturing a thin and light LCD device is to eliminate the use of the gate printed circuit board in an LCD device.

Although not shown in the drawing, a timing controller (not shown) for converting and processing external data to generate and output various control signals, driving voltages, and image information items is provided in the data printed circuit board 31. The timing controller supplies the various control signals, driving voltages, and image information items to the TFT array substrate 11 through the data TCPs 32. The control signals and the driving voltages output from the timing controller are not directly supplied to the gate printed circuit board 21 like in the related art but are supplied through the TFT array substrate 11. Therefore, on the TFT array substrate 11, line-on-glass lines for supplying the various control signals and driving voltages to the gate driving integrated circuits 23 are formed. The line-on-glass lines are obtained by directly forming wiring lines for transmitting signals on a substrate.

The control signals and the driving voltages supplied to the TFT array substrate 11 are supplied to the gate driving integrated circuits 23 through the line-on-glass lines. Among the control signals, the driving voltages, and the image information output from the timing controller, the control signals, the driving voltages and the image information are supplied to the data driving integrated circuits 33 and the control signals and the driving voltages are transmitted through a predetermined region of the first data TCP 32 to be supplied to the line-on-glass lines formed on the data pad region of the TFT array substrate 11. The line-on-glass lines are formed in the gate pad region to which the gate TCPs 22 are connected, such that the data pad region and the gate pad region are connected to each other by the shortest distance. The line-on-glass lines are positioned outside the image display region 13. If the line-on-glass lines are formed in the image display region 13, the aperture ratio of the pixels deteriorates due to the line-on-glass such that quality of images may deteriorate.

FIG. 2 is an enlarged view of a portion of a liquid crystal display panel illustrating where line-on-glass lines are formed according to the related art. In FIG. 2, a liquid crystal display panel includes a first substrate 111 and a second substrate (not shown) that face each other and that are attached to each other with a predetermined cell-gap therebetween. A liquid crystal layer (not shown) is formed in the cell-gap between the first substrate 111 and the second substrate in an image display region 113 in which images are displayed. A seal pattern 160 is formed along the outer of the image display region 113 to attach the first substrate 111 to the second substrate and to prevent the liquid crystal layer from leaking. A silver dot 150 is formed outside the seal pattern 160 to electrically connect the first substrate 111 and the second substrate (not shown) to each other, and a plurality of line-on-glass lines 140 are formed between the image display region 113 and the silver dot 150.

On the first substrate 111, the line-on-glass lines 140 for connecting the gate pad region and the data pad region to each other are formed. The line-on-glass lines 140 transmit the control signals and the driving voltages supplied from the timing controller (not shown) to the data pad region to the gate driving integrated circuits, thereby electrically connecting the data pad region to the gate pad region. As a result, a gate printed circuit board for supplying control signals to the gate driving integrated circuits is not needed.

Since the line-on-glass lines 140 are formed on the first substrate 111 to apply the control signals and the driving voltages to the respective gate driving integrated circuits, the line-on-glass lines 140 are made as short as possible in order to minimize the delay and distortion of signal and as wide as possible in order to reduce the resistance of lines. Therefore, the line-on-glass lines 140 are not formed in the outside of the first substrate 11 but are formed between the image display unit 113 and the silver dot 140. Since the line-on-glass lines 140 formed as described above can connect the gate pad region and the data pad region to each other by the shortest distance, it is possible to minimize the distortion and delay of the signals supplied through the line-on-glass lines 140.

For instance, the line-on-glass lines 140 can be formed in a process of forming the gate lines and the data lines. In addition, an insulating layer and a protective film are laminated on the line-on-glass lines 140.

On the other hand, the seal pattern 160 of the first substrate 111 is formed of a sealant that is a liquid having viscosity outside the image display unit 113. After the first substrate 111 and the second substrate are attached to each other, the seal pattern 160 is hardened by ultraviolet (UV) rays. When the UV rays are radiated onto the top the second substrate, since the UV rays are intercepted by the black matrix formed on the second substrate, it is difficult to harden the seal pattern 160. Therefore, the UV rays are radiated onto the bottom of the first substrate. However, the UV rays are not radiated onto the region in which the line-on-glass lines 140 overlap the seal pattern 160, since the line-on-glass lines 140 are formed of an opaque metal. Thus, where the line-on-glass lines 140 overlap the seal pattern 160, the seal pattern 160 is not hardened, such that liquid crystal may leak.

FIG. 3A is a schematic cross-sectional view of a lamination structure of the liquid crystal display panel shown in FIG. 2. As shown in FIG. 3A, a black matrix 165 is formed on the second substrate 112. In particular, the first and second substrates 111 and 112 are attached to each other by the seal pattern 160 with the black matrix 165 facing the line-on-glass lines 140. Further, the line-on-glass lines 140 include a plurality of holes 175 where it overlaps the seal pattern 160. Thus, a predetermined amount of UV rays radiated onto the bottom of the first substrate 111 is transmitted through the holes 175 onto the seal pattern 160.

Although not shown in the drawing, the insulating layer and the protective film are formed on the line-on-glass lines 140, such that the line-on-glass lines 140 are electrically insulated from the upper portion. The seal pattern 160 is formed on the line-on-glass lines 140 to attach the first substrate 111 and the second substrate 112 to each other. A liquid crystal material is filled in the space between the first substrate 111 and the second substrate 112 and is stored.

FIG. 3B is an enlarged view of a portion of the liquid crystal display panel shown in FIG. 2. As shown in FIG. 3B, the line-on-glass lines 140 overlap the seal pattern 160 in some regions. Since the line-on-glass lines 140 are made of an opaque metal, where the line-on-glass lines 140 overlap the seal pattern 160, the UV rays radiated onto the bottom of the first substrate 111 pass through the first substrate 111 made of transparent glass but do not pass through the line-on-glass lines 140, such that it is difficult to harden the seal pattern 160.

Therefore, the plurality of holes 175 are formed in the line-on-glass lines 140 corresponding to the regions in which the line-on-glass lines 140 overlap the seal pattern 160, such that a predetermined amount of UV rays is transmitted through the holes 175 to harden the seal pattern 160. However, the overall conductive area of the line-on-glass lines 140 is reduced by the holes 175, such that the resistance of the line-on-glass lines 140 increases. Thus, the control signals and the driving voltages supplied through the line-on-glass lines 140 are still attenuated due to the increase in resistance, thereby deteriorating the picture quality of the LCD device.

SUMMARY OF THE INVENTION

Accordingly, the present invention is directed to a liquid crystal display panel that substantially obviates one or more of the problems due to limitations and disadvantages of the related art.

An object of the present invention is to provide a liquid crystal display panel in which line-on-glass lines are formed outside a silver dot such that it is possible to prevent the area of the line-on-glass lines from being reduced, to prevent signals from attenuating due to the resistance of the lines, and to thus improve the picture quality of a liquid crystal display device (LCD).

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display panel includes first and second substrates attached to each other by a seal pattern, the seal pattern being outside of a display region, a liquid crystal layer between the first and second substrates in the display region, a silver dot outside the seal pattern for electrically connecting the first substrate to the second substrate, and a first line-on-glass line and a second line-on-glass line on the first substrate outside the display region, the first line-on-glass line is completely in a pad region outside of the silver dot.

In another aspect, a liquid crystal display device includes a first substrate including a first region, a second region, a third region and a fourth region, the second region being at a periphery of the first region, the third region being at a periphery of the second region, and the fourth region being at a periphery of the third region, a seal pattern at the second region, the first substrate being attached to a second substrate with a predetermined space therebetween by the seal pattern, a liquid crystal layer between the first and second substrates within the first region, a silver dot formed in the third region, and at least one first conductive line formed within the fourth region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
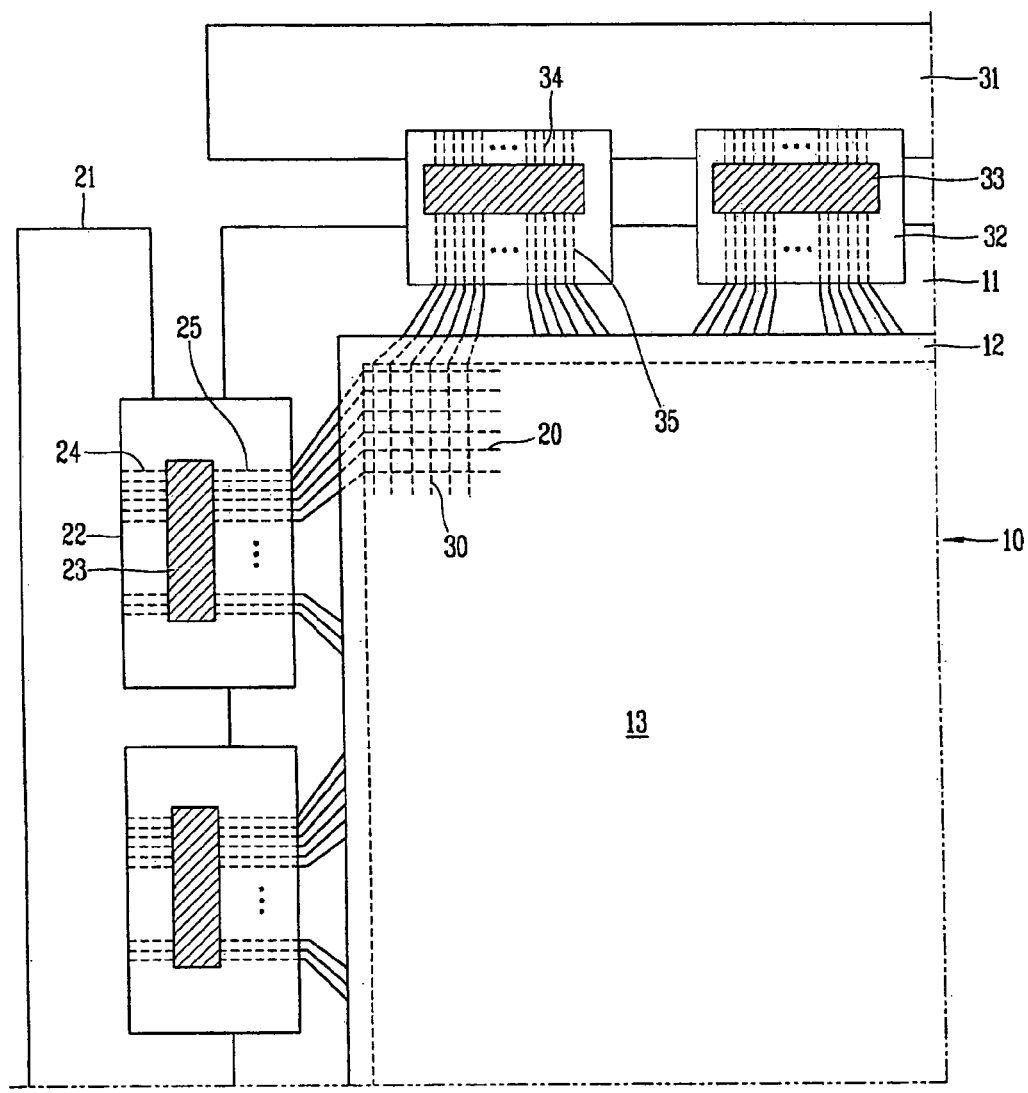
FIG. 1 is a schematic planar view of a liquid crystal display device according to the related art.
Figure 2:
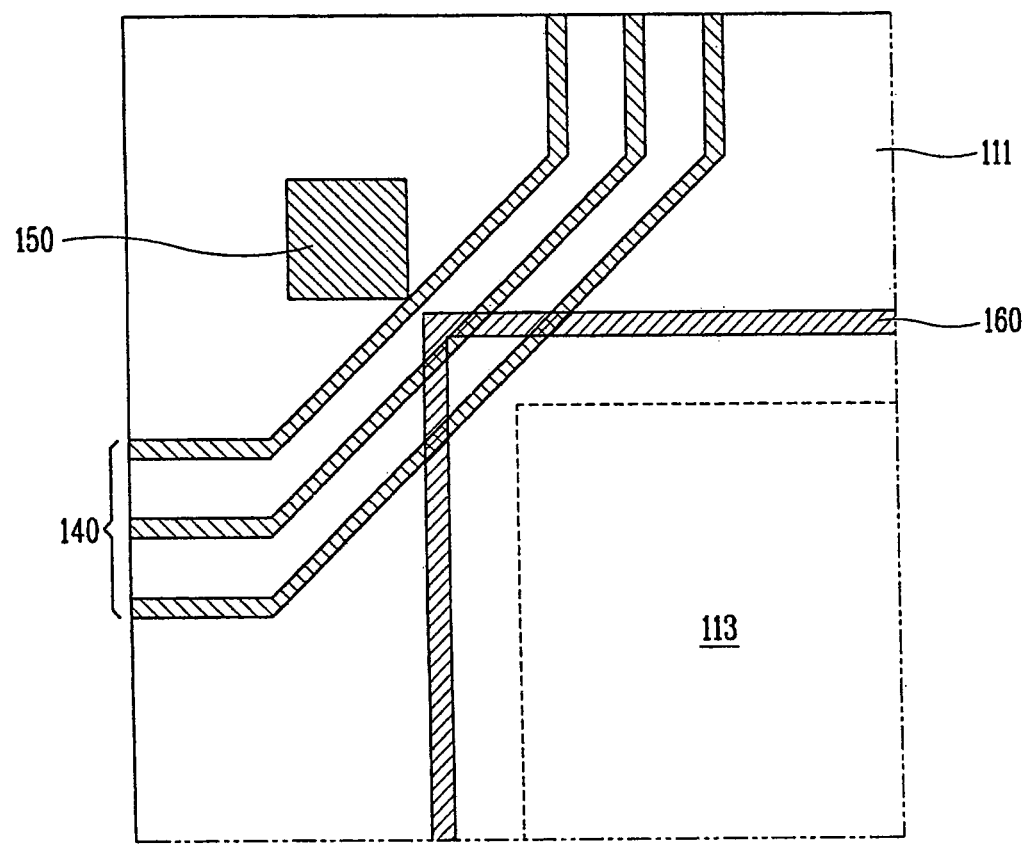
FIG. 2 is an enlarged view of a portion of a liquid crystal display panel illustrating where line-on-glass lines are formed according to the related art.
Figure 3A:
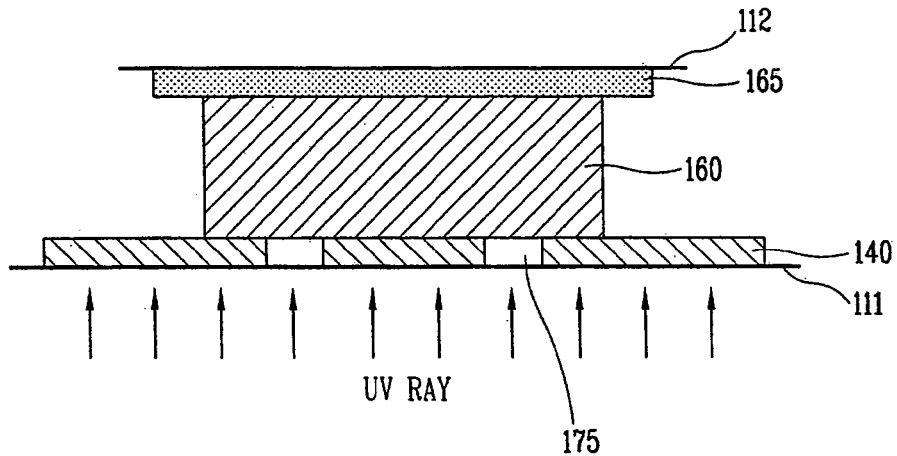
FIG. 3A is a schematic cross-sectional view of a lamination structure of the liquid crystal display panel shown in FIG. 2.
Figure 3B:
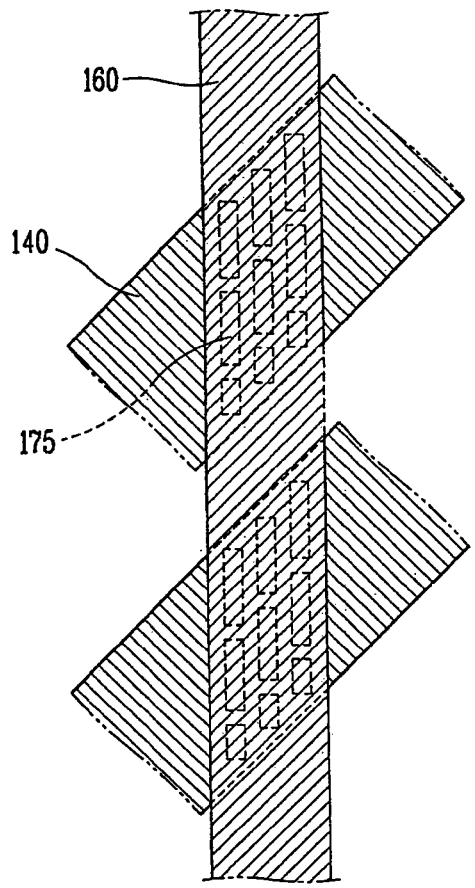
FIG. 3B is an enlarged view of a portion of the liquid crystal display panel shown in FIG. 2.
Figure 4:
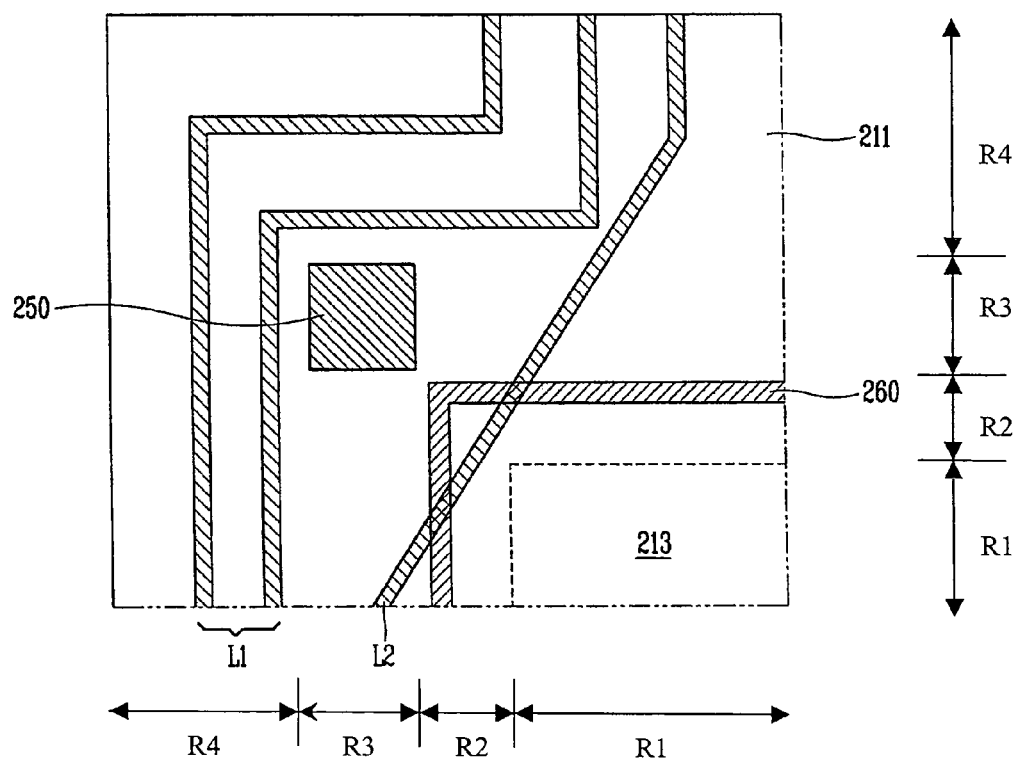
FIG. 4 is an enlarged view schematically illustrating a portion of a liquid crystal display panel according to an embodiment of the present invention.

FIG. 4 is an enlarged view schematically illustrating a portion of a liquid crystal display panel according to an embodiment of the present invention. In FIG. 4, a liquid crystal display panel includes a first substrate 211. The first substrate 211 may be attached to a second substrate (not shown) by a seal pattern 260 with a predetermined cell gap therebetween. Although not shown, a plurality of gate lines and data lines may be formed in a matrix-like manner, thereby defining a plurality of pixel regions at an image display region 213 of the liquid crystal display panel, and a liquid crystal layer may be formed in the image display region 213 between the first substrate 211 and the second substrate. In particular, the seal pattern 260 is formed at a periphery of the image display region 213 and the seal pattern 260 may confine the liquid crystal layer within the image display region 213.

In addition, a silver dot 250 is formed outside the seal pattern 260. The first substrate 211 and the second substrate are electrically connected through the silver dot 250. For instance, a common voltage may be applied from the first substrate 211 to the second substrate through the silver dot 250.

Recently, LCD devices become thinner and having less weight. In order to make LCD devices thinner and having less weight, it is necessary to minimize the area of the driving unit in which various circuits and lines are formed and to maximize the image display region in which images are actually displayed. The larger the image display region is, the smaller the gate pad region and the data pad region of the liquid crystal display panel are. Therefore, it is difficult to secure a space in which various signal lines and electrostatic preventing circuits are formed. Hence, various signal lines should be optimally arranged in the limited pad region.

For instance, at least one first line-on-glass line L1 is formed outside the silver dot 250, and at least one second line-on-glass line L2 is formed between the image display region 213 and the silver dot 250. In particular, the at least one first line-on-glass L1 may be formed completely in a pad region outside the silver dot 250. In addition, although not shown, a portion of the second line-on-glass line L2 may be in the pad region and may extends into a narrow region between the silver dot 250 and the seal pattern 260. Since the second line-on-glass line L2 is formed between the silver dot 250 and the image display region 213, the length of the lines L2 is reduced.

Alternatively, the second line-on-glass line L2 may extend from the pad region into a region between the image display region 213 and the silver dot 250 and then out into the pad region, such that a portion of the second line-on-glass line L2 overlaps the seal pattern 260. More specifically, the second line-on-glass line L2 may include a plurality of holes where it overlaps the seal pattern 260. As a result, UV rays may be radiated onto the seal pattern 260 even at the portion intercepted by the second line-on-glass line L2. However, the resistance of the lines increases due to the holes.

Thus, one or more first line-on-glass lines L1 may be formed outside the silver dot 250 and one or more second line-on-glass lines L2 may be formed in the region between the silver dot 250 and the image display region 213. In particular, the number of the first line-on-glass lines L1 may be greater than the number of the second line-on-glass lines L2. For instance, when the region outside the silver dot 250 is insufficient, the second line-on-glass lines L2 are formed in the region between the silver dot 250 and the image display unit 213.

Accordingly, the second line-on-glass lines L2 may be formed outside a first region R1. The first region R1 may correspond to the image display region 213. In particular, the second line-on-glass lines L2 may be formed in second to fourth regions R2 to R4, and the silver dot 250 may be formed in the third region R3. However, the first line-on-glass lines L1 may be formed only in the fourth region R4 at a periphery of the first to third regions R1 to R3.

Further, the location of these line-on-glass lines in the pad region may affect the attenuation of signals supplied thereto. For example, among various control signals and driving voltages applied to the gate driving integrated circuits of the liquid crystal display panel, the scan signals applied to the gate lines to drive the switching elements and, to thus directly affect picture quality. Similarly, the common voltage that determines the charge amount of the pixels and the ground voltage of the liquid crystal display panel also significantly affect the driving of the liquid crystal display panel. Therefore, if the scan signals, the common voltage, and the ground voltage are attenuated or delayed, the picture quality of the liquid crystal display panel may severely deteriorate. Hence, in the region outside the silver dot 250 where holes through which the UV rays pass are not necessary, the scan signals, the common voltage, and the ground voltage preferably may be applied to the first line-on-glass lines L1.

Moreover, among the first line-on-glass lines L1 for supplying the scan signals, the common voltage, and the ground voltage, the first line-on-glass line L1 for supplying the scan signals that significantly affect picture quality is the most important. Therefore, if a space of the region outside the silver dot 250 may form only one line, the first line-on-glass line L1 for supplying the scan signals may be formed first. After forming the first line-on-glass line L1 for supplying the scan signals, the first line-on-glass line L1 for supplying the common voltage or the ground voltage may be formed. The order in which the first line-on-glass lines L1 are formed may vary with the model or the fabrication environment of an LCD device.

On the other hand, when the first line-on-glass lines L1 for supplying the scan signals, the common voltage, and the ground voltage are simultaneously formed in the region outside the silver dot 250, the first line-on-glass line L1 for supplying the common voltage may be formed closest to the silver dot 250. That is, the first line-on-glass line L1 for supplying the common voltage is formed in the region closest to the silver dot 250, such that the silver dot 250 easily receives the common voltage in which signal attenuation and delay are minimized to apply the common voltage to the color filter substrate.

Moreover, the first and second line-on-glass L1 and L2 may be formed at the same process of forming the gate lines and the data lines. In addition, an insulating layer and a protective film are laminated on the first and second line-on-glass lines L1 and L2.

Accordingly, the first and second line-on-glass lines L1 and L2 electrically connect the gate pad region and the data pad region to each other. In particular, the first and second line-on-glass lines L1 and L2 transmit the control signals and the driving voltages supplied from the timing controller (not shown) to the data pad region to the gate driving integrated circuits. As a result, a gate printed circuit board for supplying control signals to the gate driving integrated circuits is not needed, thereby making the liquid crystal display device thinner and lighter.

It will be apparent to those skilled in the art that various modifications and variations can be made in the liquid crystal display panel of the present invention without departing from the sprit or scope of the invention. Thus, it is intended that the present invention covers the modifications and variations of this invention provided they come within the scope of the appended claims and their equivalents.

What is claimed is:

1. A liquid crystal display panel, comprising:
   first and second substrates attached to each other by a seal pattern, the seal pattern being outside of a display region;
   a plurality of data and gate lines in a matrix-like manner, thereby defining a plurality of pixels at the display region;
   a data driving circuit for driving the data lines;
   a gate driving circuit for driving the gate lines,
   a liquid crystal layer between the first and second substrates in the display region;
   a silver dot outside the seal pattern for electrically connecting the first substrate to the second substrate; and
   a first line-on-glass line and a second line-on-glass line for connecting the data driving circuit to the gate driving circuit for applying a signal to the gate driving circuit, the first line-on glass line and the second line-on-glass line being disposed on the first substrate outside the display region,
   wherein the first line-on-glass line is completely in a pad region outside of the silver dot and the second line-on-glass line being disposed on the pad region between the silver dot and the seal pattern.

2. The liquid crystal display panel according to claim 1, wherein the second line-on-glass line has a first portion between the silver dot and the display region.

3. The liquid crystal display panel according to claim 2, wherein the first portion is between the silver dot and the seal pattern.

4. The liquid crystal display panel according to claim 1, wherein the second line-on-glass line has a portion overlapping the seal pattern.

5. The liquid crystal display panel according to claim 4, wherein the second line-on-glass line includes a plurality holes where the second line-on-glass line overlaps the seal pattern.

6. The liquid crystal display panel according to claim 1, wherein scan signals are applied to the first line-on-glass line.

7. The liquid crystal display panel according to claim 1, further comprising a third line-on-glass line being parallel to the first line-on-glass line.

8. The liquid crystal display panel according to claim 7, wherein a common voltage is applied to the first line-on-glass line, and a ground voltage is applied to the third line-on-glass line.

9. The liquid crystal display panel according to claim 7, wherein a common voltage is supplied to the line-on-glass line closest to the silver dot among the first line-on-glass line and the third line-on-glass line.

10. The liquid crystal display panel according to claim 1, wherein a common voltage is applied from the first substrate to the second substrate through the silver dot.

11. A liquid crystal display device, comprising:
   a first substrate including a first region, a second region, a third region and a fourth region, the second region being at a periphery of the first region, the third region being at a periphery of the second region, and the fourth region being at a periphery of the third region;
   a plurality of data and gate lines in a matrix-like manner, thereby defining a plurality of pixels at the first region;
   a data driving circuit for driving the data lines;
   a gate driving circuit for driving the gate lines;
   a seal pattern at the second region, the first substrate being attached to a second substrate with a space therebetween by the seal pattern;

a liquid crystal layer between the first and second substrates within the first region;

a silver dot formed in the third region;

at least one first conductive line for connecting the data driving circuit to the gate driving circuit for applying signal to the gate driving circuit, the first conductive line being formed in the fourth region; and at least one second conductive line for connecting the data driving circuit to the gate driving circuit for applying a signal to the gate driving circuit, the second conductive line overlapping with the seal pattern in the second region.

12. The liquid crystal display device according to claim 11, wherein the gate driving circuit receives at least one control signal from the at least one first conductive line.

13. The liquid crystal display device according to claim 11, wherein the at least one second conductive line includes a plurality holes where the at least one second conductive line overlaps the seal pattern in the second region.

14. The liquid crystal display device according to claim 11, wherein the at least one second conductive line extends from the fourth region into the third and second regions.

15. The liquid crystal display device according to claim 11, wherein the at least one first conductive line is a line-on-glass line formed directly on the first substrate.

16. The liquid crystal display device according to claim 11, wherein scan signals are applied to the at least one first conductive line.

* * * * *